(12) United States Patent
Mohlin et al.

(10) Patent No.: US 6,231,761 B1
(45) Date of Patent: May 15, 2001

(54) ROTARY DISK FILTER

(75) Inventors: Anders Mohlin, Trelleborg; Ake Ralvert, Hässleholm, both of (SE)

(73) Assignee: Hydrotech Nils-Ake Persson Aktiebolag, Vellinge (SE)

(*) Notice: Subject to any disclaimer, the term of this patent is extended or adjusted under 35 U.S.C. 154(b) by 0 days.

(21) Appl. No.: 09/590,683

(22) Filed: Jun. 9, 2000

Related U.S. Application Data

(63) Continuation of application No. PCT/SE98/02294, filed on Dec. 11, 1998.
(60) Provisional application No. 60/085,807, filed on May 18, 1998.

(30) Foreign Application Priority Data

Dec. 12, 1997 (SE) ..................................... 9704632

(51) Int. Cl.⁷ .................................................. B01D 33/23
(52) U.S. Cl. .......................... 210/232; 210/346; 210/331; 210/486
(58) Field of Search .................................... 210/232, 346, 210/331, 486, 492

(56) References Cited

U.S. PATENT DOCUMENTS

| | | | |
|---|---|---|---|
| 2,964,194 | * 12/1960 | Oliver, Jr. et al. . | |
| 3,363,770 | * 1/1968 | Glos, II . | |
| 3,369,668 | * 2/1968 | Glos, II . | |
| 3,643,803 | * 2/1972 | Glos, II . | |
| 4,814,093 | * 3/1989 | Frykhult . | |
| 5,084,174 | 1/1992 | Perälä et al. . | |
| 5,296,143 | * 3/1994 | Frykhult . | |
| 5,330,646 | * 7/1994 | Frykhult . | |
| 5,635,062 | * 6/1997 | Cameron et al. . | |

FOREIGN PATENT DOCUMENTS

| | | |
|---|---|---|
| 1 461 437 | 2/1969 | (DE) . |
| 224 131 | 7/1969 | (SE) . |
| 465 857 | 11/1991 | (SE) . |
| 91/12067 * | 8/1991 | (WO) . |
| WO 94/19088 | 9/1994 | (WO) . |
| WO 97/35656 | 10/1997 | (WO) . |

* cited by examiner

Primary Examiner—Thomas M. Lithgow
(74) Attorney, Agent, or Firm—Finnegan, Henderson, Farabow, Garrett & Dunner, L.L.P.

(57) ABSTRACT

A rotary disk filter comprises a rotatable drum (2) and at least one disk-shaped filter member (10), which on the outside of the drum extends outwards in the transverse direction of the drum. The filter member (10) has a filter support unit (40) and a filter portion (21) supported thereby. A liquid duct (6) extends from the drum (2) through the filter member (10) and out through the filter portion (21). The filter portion is formed of at least one filter segment (20) which comprises a filter frame (22) and a filter cloth (21) expanded by the frame. The filter segment (20) is detachably secured to the filter support unit.

9 Claims, 3 Drawing Sheets

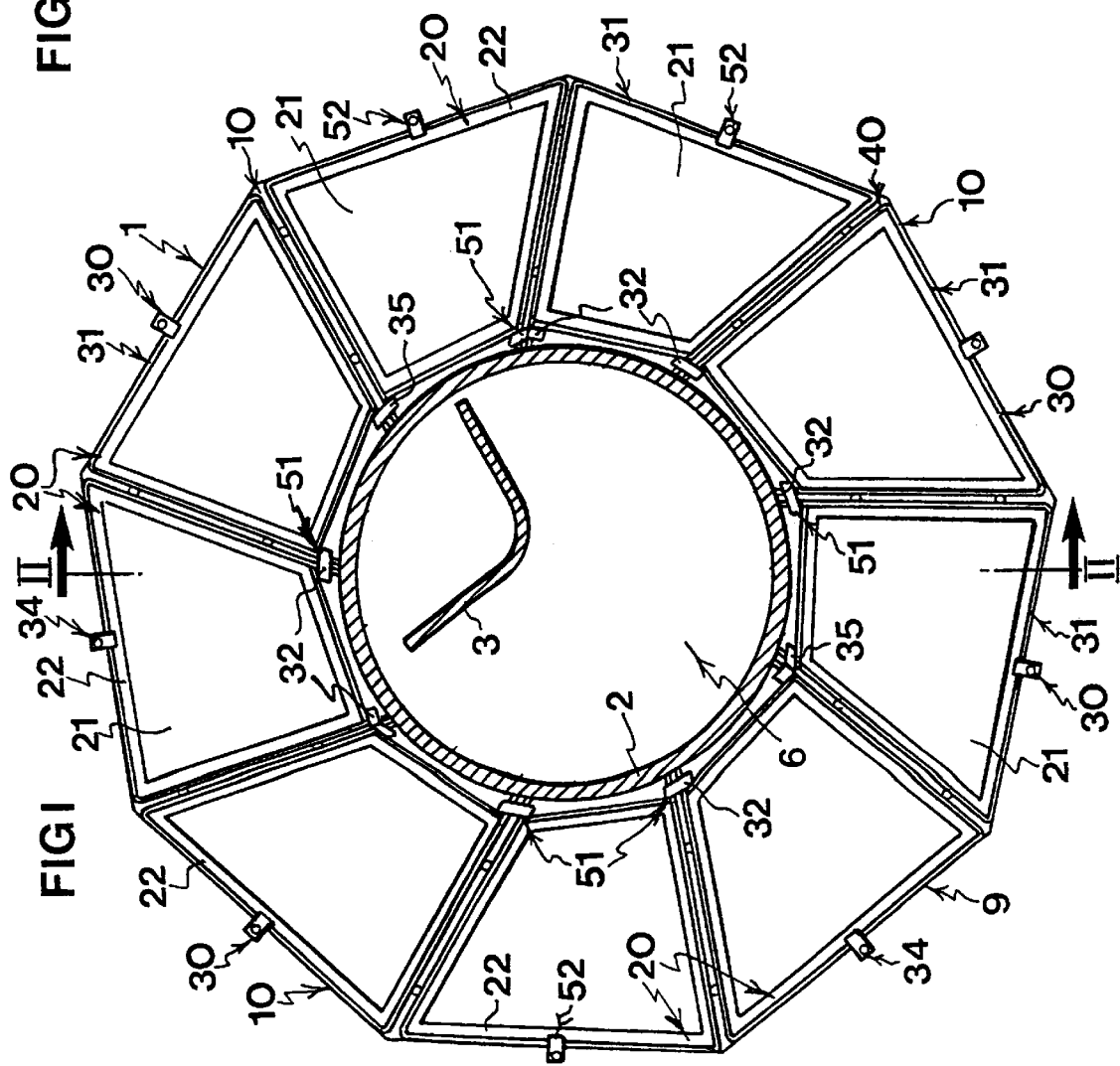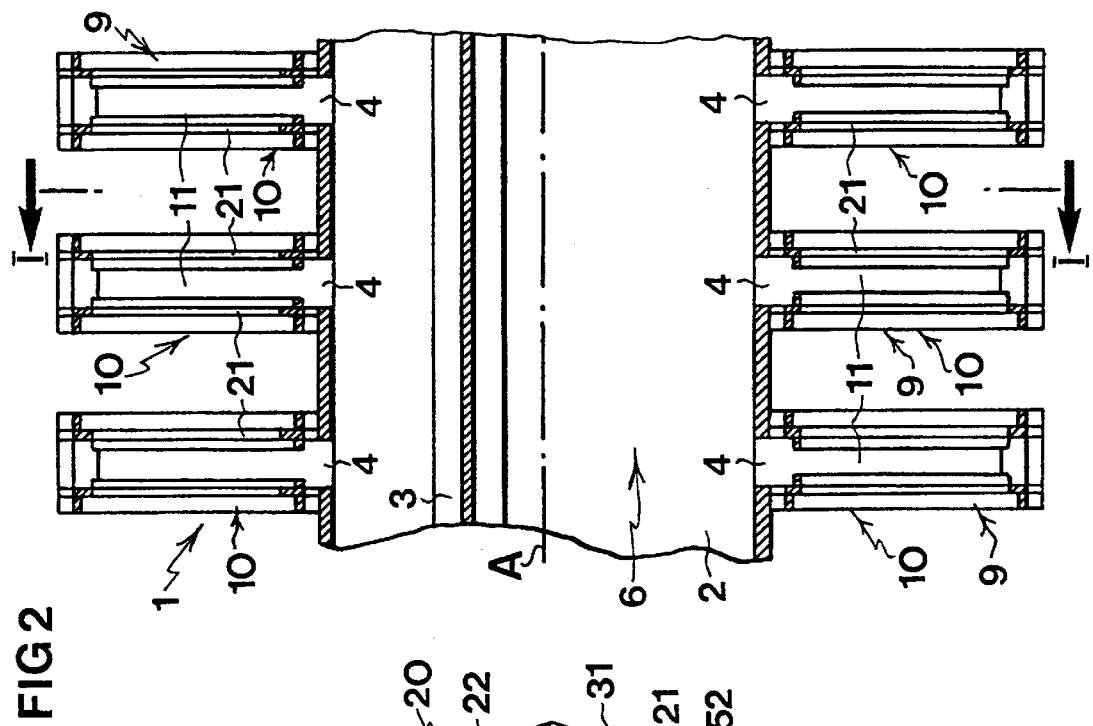

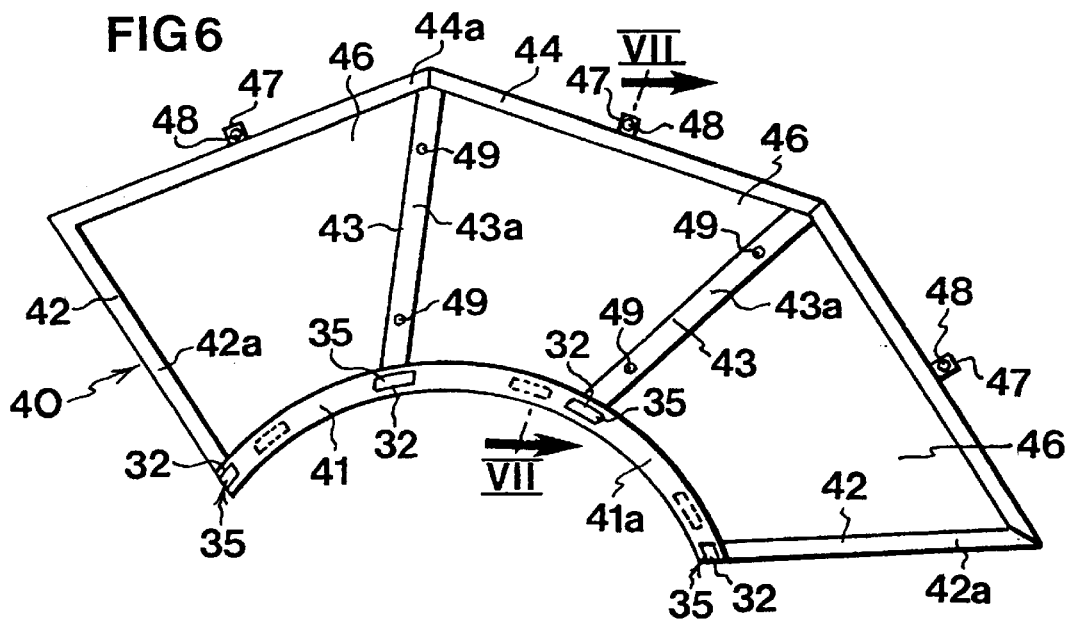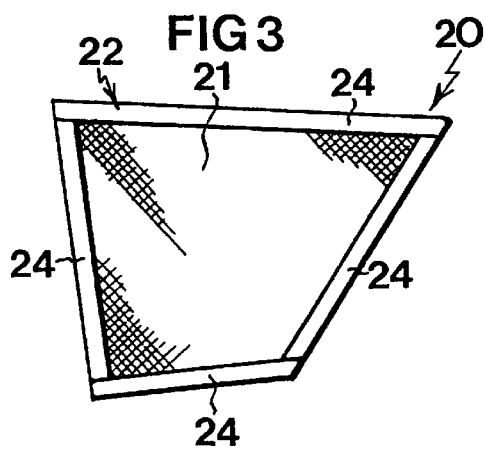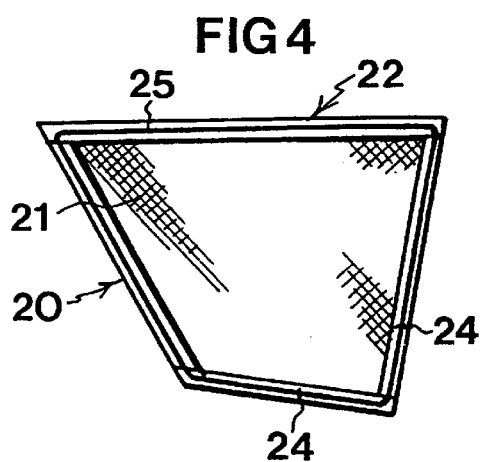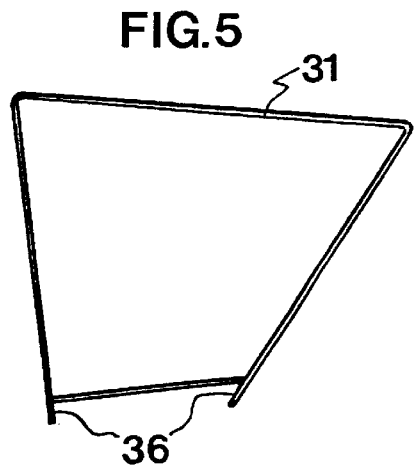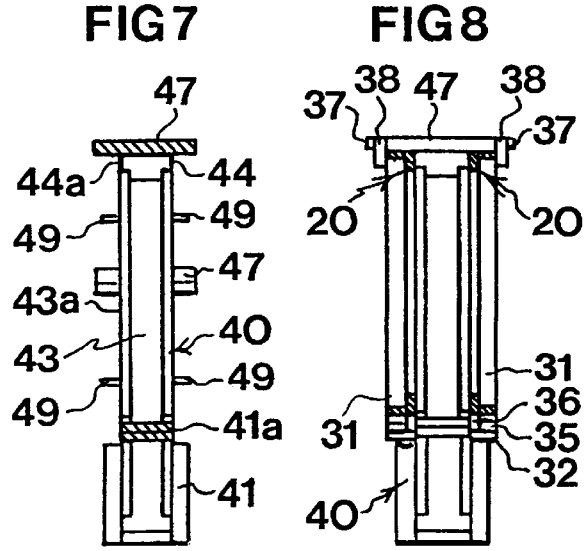

ROTARY DISK FILTER

This application is a continuation of international application number PCT/SE98/02294, filed Dec. 11, 1998, and claims the benefit of provisional application Ser. No. 60/085,807, filed May 18, 1998 the content of both of which is incorporated herein by reference.

FIELD OF THE INVENTION

The present invention relates to a rotary disk filter according to the preamble to appended claim 1. The invention concerns specifically rotary disk filters where filtration occurs as liquid flows out of one or more disk-shaped filter members.

BACKGROUND ART

Rotary disk filters of the type mentioned above are usually employed for filtering water in wastewater treatment plants. A usual design of a rotary disk filter according to prior art is schematically shown in FIG. 9.

An example of such a rotary disk filter is disclosed in SE-C-224,131. In this filter, water is conducted through one end of a central rotatable drum and via openings in the circumference of the drum radially outwards to disk-shaped filter chambers. Each of the filter chambers is defined by a disk-shaped filter member having opposing filter portions which are supported by an annular filter support unit arranged between the same. The filter members are mounted in parallel along the longitudinal axis of the drum. When water flows out through the filter portions, particles are retained in the filter chambers. When cleaning the filter portions, the drum is rotated and water is flushed onto the filter portions from outside in the upper area of the rotary disk filter, particles and water flowing into the upper area of the drum and being collected in a trough extending through the drum. The filter portions comprise annular filter cloth portions arranged on the sides of the filter support units.

SE-B-465,857 discloses a rotary disk filter of a similar kind, in which the disk-shaped filter members comprise a plurality of separate, disk-shaped filter sections, which together establish annular filter members. By the annular filter members being divided into a plurality of separate units, also the filter cloth is divided into smaller pieces, which means that in case of a local damage to the cloth a replacement of the cloth is necessary on only one of the filter sections, not on an entire annular disk.

In the two rotary disk filters described above, the filter cloth can be fastened in one of a plurality of ways. In a common solution, the filter cloth is glued directly to the filter support unit on the opposing sides thereof. This is particularly common when the cloth consists of some textile or plastic material. The cloth can Also be made of metal. In that case, it is often welded to the filter support unit, and if necessary, reinforcement ribs are welded to the outside of the filter cloth for improved securing thereof. In a further way of fixing the cloth to the support unit, the cloth is designed as a "bag", which is slipped around a filter support unit and is shrunk on the same.

Rotary disk filter constructions of this kind suffers from several problems. The filter cloth has a limited life in normal use and must be replaced at regular intervals. Moreover, the filter cloth is sensitive and can easily be damaged, necessitating a premature replacement thereof. If the cloth is damaged, an entire filter cloth portion must be replaced.

In all the ways described above, it is an extremely difficult and complicated operation to remove an old cloth and fasten a new cloth on the filter support unit, which means that this operation must be carried out by qualified experts and in a convenient industrial environment. Therefore the work is usually carried out by manufacturers of rotary disk filters, which means that entire rotary disk filter support units, which are annular or in the shape of annular sections, must be transported, in many cases over long distances, to the place of repair, even if the filter cloth has been damaged only locally on one side of the filter support unit. This causes a number of problems.

It is a heavy and difficult operation to dismount filter support units in a rotary disk filter, which in itself results in long down-times. At the same time there is a risk that, in connection with this operation, the filter cloth of neighbouring filter members is damaged unintentionally. Moreover, several persons are required for the dismounting and mounting work.

Transporting the filter support units for replacement of filter cloth is per se an expensive operation. This also takes time, and therefore a number of replacement filter support units provided with new filter cloth must be kept in stock, thereby avoiding long down-times.

Cloth that has been glued or welded to the support unit has a tendency to be split away from the filter support unit in operation, which per se leads to a premature exchange of the filter cloth being necessary.

Another problem of today's rotary disk filter designs is that when cutting filter cloth for disk-shaped or disk section-shaped filter support units, a large amount of filter cloth will be wasted. This draw-back is particularly pronounced when using so-called microfilter cloth which has very small filter apertures and is expensive to manufacture.

EP-B-0 684 868 discloses a different type of rotary disk filter which is intended for filtration from the outside of a filter member as liquid flows in from outside. Such a filter suffers from a number of draw-backs. For instance, it is practically impossible to clean the filter cloth by flushing in the direction opposite to the filtering direction. In contrast to this construction, the invention concerns a rotary disk filter having an opposite direction of flow, thus requiring completely different constructional details.

SUMMARY OF THE INVENTION

An object of the present invention is to provide a rotary disk filter which is improved in relation to the prior-art technique as described above.

A special object is to reduce the difficulties connected with the repair of damaged filter cloth.

One more special object of the invention is to provide a rotary disk filter which is improved relative to the prior-art technique described above and which is intended for filtration of a liquid of the kind that flows into the drum, out to the chambers defined by the filter support unit and the filter cloth, and out through the filter cloth.

According to the invention, these and other objects that will appear from the following specification are now achieved by a filter which is of the type described by way of introduction and which in addition has the features stated in the characterising clause of claim 1.

In the rotary disk filter according to the invention there is thus formed a filter portion in a disk-shaped filter member of at least one filter segment, which is detachably secured to a filter support unit and comprises a filter frame and a filter cloth expanded by the frame.

By the filter cloth being arranged in this manner on the filter support unit, it is possible to easily renew the filter cloth by exchanging filter segments. The demand for dismounting and transporting entire filter support units has thus been obviated. Moreover, it is possible, when a local exchange of filter cloth is required, to exchange only one filter segment on one side of the filter support unit. Furthermore the down-times that are associated with the exchange of filter cloth have been confined to a minimum. Thus, the cost and work of exchanging filter cloth could be drastically reduced.

The rotary disk filter has a holding means for the filter segment comprising a first holding device, which is positioned at the edge of the associated filter frame facing the drum, and a second holding device, which is positioned at the edge of the associated filter frame facing away from the drum. This results in adequate engagement of the filter frame in spite of a small number of securing points.

The holding means comprises a holding frame, which has a contour essentially conforming with the contour of the associated filter frame and which is arranged on the outside of the filter frame to provide this with the desired rigidity in the plane of the filter cloth. This ensures excellent engagement across the entire filter frame. The holding frame constitutes a part which is separable from the filter frame, which means that the holding frame can be reused when the filter segment is exchanged. Thus, the filter frame, which is a replacement part, can be given a relatively small dimension and a low weight since the holding frame can be given great rigidity and, consequently, guarantee that the filter frame has good engagement with the filter support unit. Moreover, the holding frame constitutes a protective flange projecting from and surrounding the filter cloth. This reduces the risk that, when working in the vicinity of the filter cloth, one unintentionally damages the same.

Preferred embodiments are stated in the subclaims.

In a preferred embodiment, the filter cloth of the filter segment is fixed to the side of the filter frame facing the filter support unit. By the filter cloth being arranged in this way on the side of the frame that faces the filter chamber and, thus, the flow of liquid, the risk of the filter cloth being split away by the liquid pressure is drastically reduced. Since the filter cloth besides is clamped between the filter frame and the filter support unit, the filter cloth is additionally fastened while simultaneously relieving its attachment to the filter frame.

In a particularly preferred embodiment, a seal is arranged between the filter support unit and the filter frame to ensure that all liquid is being filtered. The seal is preferably arranged on the filter segment. Seals and filter cloth are preferably made of materials that age at approximately the same rate when being used, and therefore both the seal and the filter cloth can easily be renewed at the same time when both belong to the exchangeable filter segment.

In a preferred embodiment of the holding means, the first holding device comprises two holding pins which are arranged on the holding frame and which cooperate with two corresponding holding openings in the filter support unit along the circumference of the drum. This makes it possible to easily secure the filter segment along the drum circumference, although this is often difficult to reach, by the holding pins being inserted into the holding openings.

The second holding device advantageously comprises a clamping means, which is settable between a disengaging position, in which the filter segment is detachable, and at least one securing position, in which the filter segment is secured to the filter support unit. In this manner, the filter segment can be locked at its edge which faces away from the drum and which is easy to reach, by adjusting the clamping means. Moreover, the clamping means is advantageously settable between several positions with a view to clamping the filter segment by applying different degrees of clamping force.

The invention is especially advantageous when filtering with so-called microfilter cloth, the filter apertures of which are in the range of 10–100 $\mu$m since there are special difficulties in the manufacture of such a filter cloth and in the fastening thereof on a surface, e.g. a metal surface.

BRIEF DESCRIPTION OF THE DRAWINGS

The invention will now be described in more detail or the purpose of exemplification, with reference to the accompanying drawings showing a preferred embodiment.

FIG. 1 shows a rotary disk filter according to the invention in a partly sectioned cross-section along line I—I in FIG. 2.

FIG. 2 shows the rotary disk filter according to FIG. 1 in a partly sectioned longitudinal section along line II—II in FIG. 1.

FIG. 3 is a side view of an inventive filter segment.

FIG. 4 shows the filter segment in FIG. 3 from the opposite direction.

FIG. 5 is a side view of a holding frame.

FIG. 6 is a side view of a rotary disk filter support unit according to the invention.

FIG. 7 is a section along line VII—VII in FIG. 6.

FIG. 8 shows a rotary disk filter support unit according to FIG. 7, which is provided with filter segments according to the invention.

DESCRIPTION OF AN EMBODIMENT OF THE INVENTION

Figure 9:
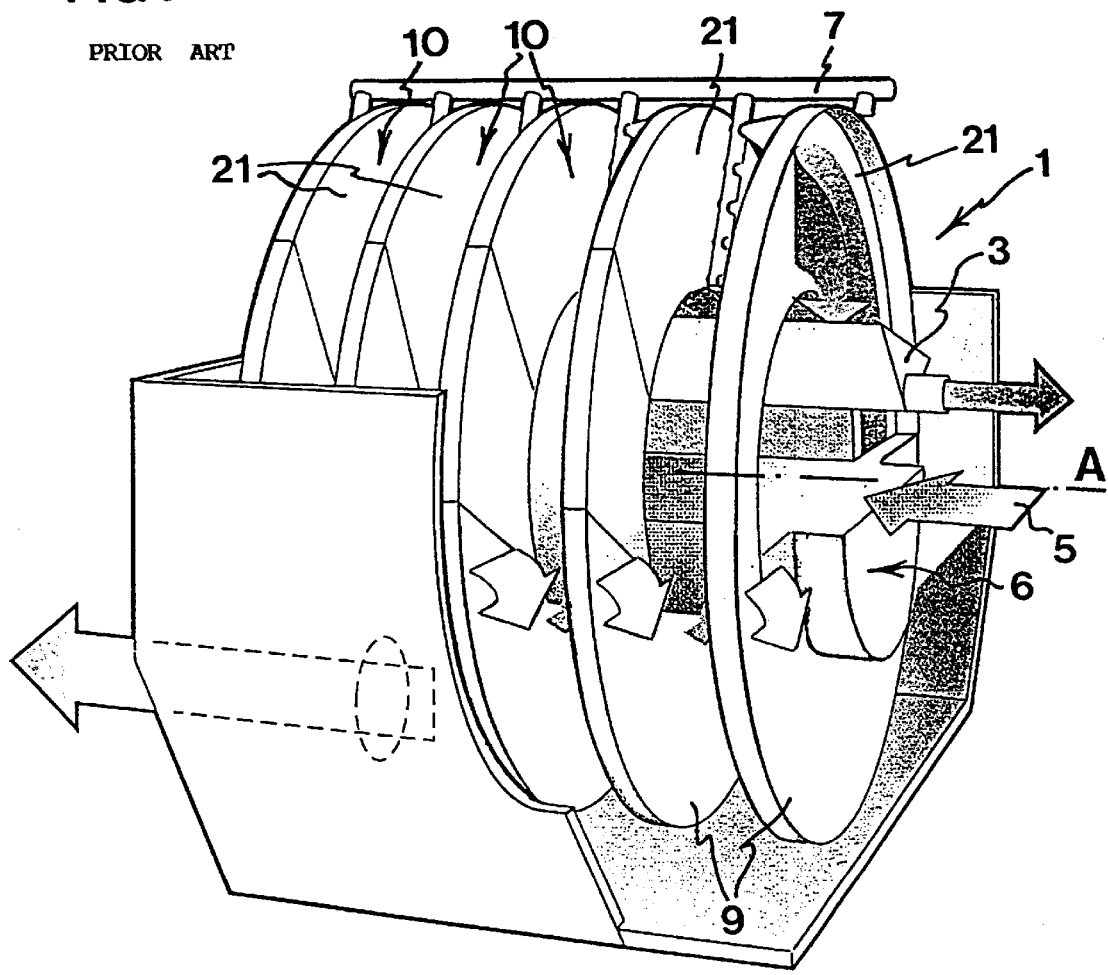
FIG. 9 is a schematic perspective view of a rotary disk filter according to prior art.

FIG. 9 is a schematic view of a rotary disk filter 1 of the type to which the invention is applicable. Below follows a description of the preferred embodiment in general with reference to FIGS. 1, 2 and 9. The rotary disk filter 1 comprises a central drum, which is rotatably arranged about a central horizontal longitudinal axis A and is adapted to receive a liquid 5 which is to be filtered. A plurality of parallel and disk-shaped filter members 10 extend outwards from the drum 2 in the transverse direction thereof. Each filter member 10 extends along 120° of the circumference of the drum 2, which means that three filter members 10 together form an annular filter 9 which is arranged concentrically with the drum 2. A plurality of such annular filters 9 are arranged in parallel after each other along the drum 2, equidistantly spaced from each other in the axial direction. A trough 3 extends through an upper area of the drum 2 in parallel therewith to draw off filtered-off particles from the rotary disk filter 1.

Each filter member 10 comprises a filter support unit 40, which is non-rotatably connected to the drum 2, preferably by means of bolts. Moreover each filter member 10 comprises on two opposing sides filter portions 21 of filter cloth which are supported by the filter support unit 40 and are arranged on opposite sides thereof. The filter portions 21 of each filter support unit 40 define, together with the filter support unit 40, a number of filter chambers 11, which via openings 4 in the drum communicate with the inside thereof. Thus a liquid duct 6 forms, in which the liquid to be filtered flows and which extends from the drum 2 via the filter chamber 11 and out through the filter portions 21. Thus the liquid is filtered through the filter portions when flowing from inside and out. As a result, particles that cannot pass through the filter cloth will be caught in the filter chamber 11. In the upper area of the rotary disk filter 1, a flushing device 7 is arranged, by means of which these particles can be flushed off from the filter cloth 21 and down into the trough 3 for cleaning the filter members 10. Filtration thus takes place in the lower area of the rotary disk filter 1, and cleaning takes place in the upper area thereof.

According to the invention, the filter portions shown in FIGS. 1 and 2 are formed of filter segments 20, each comprising a filter frame 22 and a microfilter cloth 21 of polyester expanded thereby. The filter segments 20 are detachably secured to the filter support unit 40 with the aid of holding means 30, which comprise a holding frame 31 and holding openings 32 in loops 35 along the circumference of the drum 2, which together form a first holding device 51 and a clamping means 34, which together with the holding frame 31 forms a second holding device 52 along the outer circumference of the filter support unit.

The filter segment 20 is shown in more detail in FIG. 3. A piece of filter cloth 21 is glued to the filter frame 22, which is made of flat metal rods 24 of rectangular cross-section, which are welded together. The rods 24 have their wide longitudinal side arranged in the main plane of the frame 22 to provide a large fastening surface for the filter cloth 21. By the frame 22 having a small depth (the width of the narrow longitudinal side of the rods 24), the frame 22 is easy to handle, has low weight and requires but a small space when stored.

FIG. 4 shows the filter segment 20 from the side that is intended to face away from the filter support unit 40. On this side, the filter cloth 21 is glued to the filter frame 22. A seal 25 is arranged on the filter cloth 21 to seal between the filter segment 20 and the filter support unit 40.

The design of the filter segment with a frame having four straight-sides allows an essentially improved utilisation of the area of a larger filter cloth than has previously been possible when cutting a filter cloth, on the one hand since the shape in itself is more favourable than the annular shape or annular sector shape that is common for filter support units and, on the other hand, since it is possible in a more flexible manner than before to use the area of the filter cloth when the cloth is divided into smaller pieces.

FIG. 5 shows a holding frame 31, the shape of which conforms with the shape of the filter frame 22. Also the holding frame 31 is made of metal rods of rectangular cross-section, which, however, are oriented such that the narrow longitudinal side extends along the main plane of the frame 31 and the wide longitudinal side extends in the depth of the frame 31 to provide the frame 31 with high torsional rigidity and, particularly, high rigidity in its main plane. The holding frame 31 further comprises two holding pins 36 which are adapted to cooperate with the holding openings 32 in the loops 35 to form the first holding device 51.

FIGS. 6 and 7 illustrate a filter support unit 40 according to the invention. The filter support unit 40 comprises an internal circumferential portion 41 to be connected to the drum 2, four outer and inner spokes 42, 43 extending therefrom, and an external circumferential portion 44. The two circumferential portions 41, 44 surround, together with the spokes 42, 43, opening areas 46 of three filter chambers 11. The circumferential portions 41, 44 and the spokes 42, 43 each have surface portions 41a, 44a and 42, 43a, respectively. The opening areas 46 are adapted to be covered with the above-described filter segments 20, which are then placed with the filter frame in engagement with the outer portions 41a–44a.

On the internal circumferential portion 41 of the filter support unit 40, the loops 35 are arranged adjacent to the spokes 42, 43. The loops 35 define the openings 32 of the holding means 30, said openings being adapted to cooperate with the pins 36 of the holding frame 31. On the outside of the outer circumferential portion 44 of the filter support unit 40, axially extending holding rods 47, which in their longitudinal direction have threaded bores 48, are arranged centrally between the spokes. The holding rods 47 form part of the clamping means 34 of the second holding device 52. The central spokes 43 of the filter support unit each have two guide pins 49, which are adapted to simplify the mounting of the filter segments 20 and to guarantee that these are correctly arranged on the respective filter support units 40.

It will now be described how the filter segments 20 are mounted on the filter support unit 40 with reference to FIG. 8. In the mounting operation, a filter segment 20 is radially inserted to the correct position on the filter support unit 40 in cooperation with the guide pins 49. Subsequently, a holding frame 31 with its holding pins 36 is inserted into the holding openings 32 of the holding loops 35. A clamping bolt 47 which is inserted into the threaded bore 48 of the associated holding rod 47 and on which a holding plate 38 is mounted, is then clamped such that the holding plate 38 presses the holding frame 31 and, thus, the filter segment 20 against the filter support unit 40. When dismounting, these steps are carried out in reverse order.

Finally, it should be added that the invention is in no way limited to the embodiment described. For instance, the filter frame and the holding frame can be given a different shape or be made of some other material. The holding means can be designed in an alternative way and, for instance, need not comprise a holding frame of the type shown.

What is claimed is:

1. A rotary disk filter comprising a drum (2) having a central longitudinal axis (A) and being rotatably arranged about the longitudinal axis (A), and at least one disk-shaped filter member (10) having an inner side in fluid communication with drum (2) and an outer side, which on the outside of the drum (2) extends outwards in the transverse direction of the drum (2) and said filter member (10) has a filter support unit (40) and at least one filter portion supported thereby, a liquid duct (6) extending from the drum (2) through which liquid to be filtered flows into the drum, the liquid then flows out through the filter portion while particles in the liquid that can not pass through the filter portion are caught on the filter portion of the inner side of the filter member (10) as the liquid now freed of sid particles passes to the outer side of the filter member (10) and drum (2), characterised in that the filter portion (21) is made of at least one filter segment (20), which comprises a filter frame (22) and a filter cloth (21) expanded by the filter frame (22), that each filter segment (20) is detachably secured to the filter support unit (40), that the filter segment (20) is held on the filter support unit (40) with the aid of a holding means (30), that the holding means (30) comprises a holding frame (31) which has a contour essentially corresponding to the contour of the respective filter frame (22) and which is arranged on the outer side of the filter frame (22) and constitutes a part separable from the filter frame (22), and that the holding means comprises a first holding device (51) which is located at the edge of the filter frame (22) facing the drum (2), and a second holding device (52) which is located at the edge of the filter frame (22) facing away from the drum (2).

2. A rotary disk filter as claimed in claim 1, wherein the filter cloth (21) of the filter segment (20) is fixed to the side of the filter frame (22) facing the filter support unit (40).

3. A rotary disk filter as claimed in claim 1 or 2, wherein the filter support unit (40) inside the filter portion (21) has an opening area (46), which is surrounded by surface portions (41a–44a), the opening area (46) conforming in its contour with the contour of the filter segment (20), such that the filter frame (22) engages the surface portions (41a–44a), and such that the opening area (46) is covered with filter cloth (21).

4. A rotary disk filter as claimed in any one of claims 1–2, wherein a seal (25) is arranged between the filter support unit (40) and the filter frame (22).

5. A rotary disk filter as claimed in any one of claims 1–2, wherein the filter cloth (21) is a microfilter cloth, the filter apertures of which are in the range of 10–100 µm.

6. A rotary disk filter as claimed in any one of claims 1–2, wherein the first holding device (51) comprises two holding pins (36) which are arranged on the holding frame (31) and cooperate with two corresponding holding openings (32) in the filter support unit (40) at the circumference of the drum (2).

7. A rotary disk filter as claimed in any one of claims 1–2, wherein the second holding device (52) comprises a clamping means (34), which is settable between a disengaging position, in which the filter segment (20) is detachable, and at least one securing position, in which the filter segment (20) is secured to the filter support unit (40).

8. A rotary filter disk as claimed in claim 4, wherein the seal is arranged on the filter segment (20).

9. A rotary filter disk as claimed in claim 5, wherein the microfilter cloth is a polyester fibre fabric.

* * * * *

UNITED STATES PATENT AND TRADEMARK OFFICE
CERTIFICATE OF CORRECTION

PATENT NO. : 6,231,761 B1  Page 1 of 1
APPLICATION NO. : 09/590683
DATED : May 15, 2001
INVENTOR(S) : Mohlin et al.

It is certified that error appears in the above-identified patent and that said Letters Patent is hereby corrected as shown below:

Col. 6, Line 55, "sid particles" should read --said particles--.

Col. 7, Line 3, after "(22)", insert --of the filter member (10)--.

Signed and Sealed this

Eleventh Day of July, 2006

JON W. DUDAS
*Director of the United States Patent and Trademark Office*